Dec. 13, 1966    P. F. BURCH    3,291,175
SKINNING MACHINE
Filed March 4, 1964    5 Sheets-Sheet 1
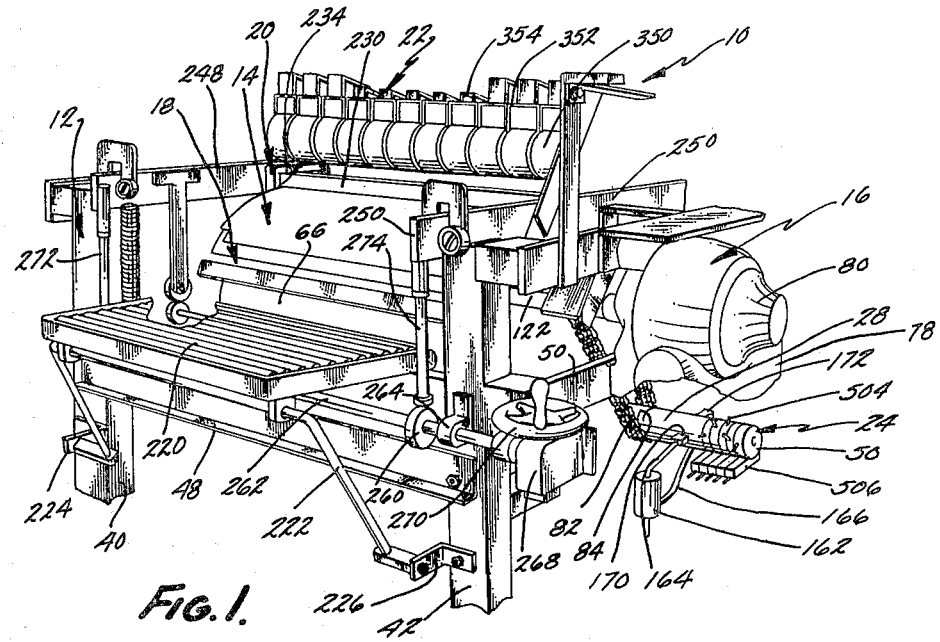
Fig. 1.
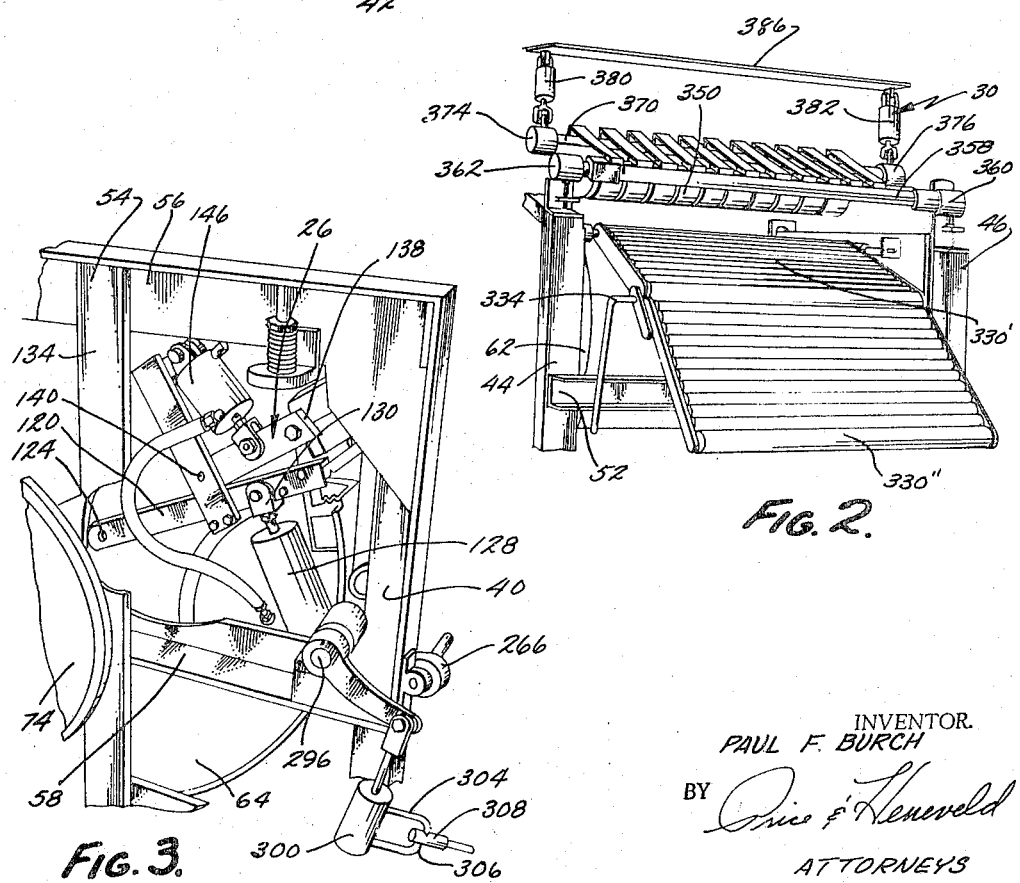
Fig. 2.
Fig. 3.
INVENTOR.
PAUL F. BURCH
BY
ATTORNEYS Dec. 13, 1966   P. F. BURCH   3,291,175
SKINNING MACHINE Filed March 4, 1964   5 Sheets-Sheet 3

INVENTOR.
PAUL F. BURCH
BY
ATTORNEYS

INVENTOR.
PAUL F. BURCH
BY
ATTORNEYS

United States Patent Office 3,291,175
Patented Dec. 13, 1966

3,291,175
SKINNING MACHINE
Paul F. Burch, Rockford, Mich., assignor to Wolverine Shoe & Tanning Corporation, Rockford, Mich., a corporation of Michigan
Filed Mar. 4, 1964, Ser. No. 349,254
9 Claims. (Cl. 146—130)

This invention relates to skinning machines, and more particularly to a unique hogside clamping mechanism for a skinning machine, capable of effectively gripping a narrow edge of the hogside, especially the teat strip of a "double" hogside, to pull it past a skinning blade, yet without the hogside pulling or tearing loose.

The growth in recent years of a consumer recognition of and demand for high quality, tough, comfortable footwear and clothing articles made of treated pigskin has required the footwear manufacturer, such as the assignee herein, to purchase considerably more skins from sources such as packing houses. Since packing houses must usually incorporate a skinning machine directly into the heart of their high speed packing lines, the skinning machine must be completely reliable. Also, since bacon, one of the most valuable products of hogs, is a substantial share of the material removed from the skin during the skinning operation, the machine should not waste any of the bacon product. If a skinning machine cannot meet both of these two stringent requirements, it is not acceptable to the packing house owners from whence the skins must be obtained. However, in efforts to meet these conditions, if the skin is damaged during removal of the bacon and fatback as by skin puncture, cutting, or gouging, the skin is not useful to the footwear manufacturer. Consequently, the skinning operation must be performed very exactly to satisfy all of these seemingly inconsistent requirements.

Moreover, the skinning machine must be capable of exactly skinning a large number of skins per unit of time, e.g., about twelve single hogsides per minute. This is necessary to maintain a speed of the packing line sufficient to avoid creating a production "bottle neck."

The hogskins used by the footwear manufacturer are conventionally "half" skins obtained from skinning socalled "single hogsides." These are created by the conventional butchering method of splitting the hog clear through, i.e., through the belly and through the backbone. The single hogside, after removal of the rib cage and loins, and when it is to be skinned, is conventionally gripped along the "fatback" at the backbone area, and pulled around a drum past a skinning blade. The resulting skins are relatively small, and therefore involve considerable waste skin around the edge once a substantial piece of skin is removed from the center to make a shoe. The larger "whole" skin from a "double hogside" naturally lends itself to more efficient yields when cutting pieces of pigskin from it. A double hogside is obtained by splitting along the belly but not clear through the back. Another advantage of skinning double hogsides is the lesser amount of subsequent "fleshing" necessary to remove residual fat from the skin. This is because the thick, tough fatback is all removed in the skinning operation rather than being partially retained in the clamp during skinning, to require later removal by fleshing.

Due to the characteristics of the hog's bodily makeup, the skin is thinnest at the center of the belly along the teat strip, and gradually gets thicker around the sides of the hog, with its thickest point being along the middle of the back adjacent the backbone. When gripping a single hogside along the split back and pulling past a skinning knife according to conventional methods, the suspended blade gradually rides from the thickest portion at the gripped back, over the tapered skin down to the thinnest portion at the belly. However, when skinning double hogsides, one of the belly edges must be gripped and pulled past the blade. Therefore, the skinning starts at the middle of the belly, and specifically the middle of the teat strip, continues across one side to the thick skin and tough fatback area adjacent the backbone area, at the half-way mark, and then along the opposite side to the middle of the belly again.

When skinning single hogsides, the clamp on the drum regularly engulfs a substantial "bite" of the slippery skin and fatback portion in order to get an effective grip. This is permissible since the fatback has a relatively small value, financially, compared to the bacon portions around the sides and belly. The belly area adjacent the teat strip has valuable bacon on it, however, although the narrow half of the teat strip on the split belly edge is of lesser value. Double hogsides split only along the belly, if skinned, therefore, must be gripped along the belly edge to be pulled around the drum past the blade. To take a large clamping "bite" would therefore cause the clamp to not only engulf the narrow teat strip portion but also a portion of adjacent bacon causing a loss of valuable bacon product. This is not tolerable. To take a small "bite," however, with the conventional clamp, often results in slipping of the hogside out of the skin clamp part way around the drum due to the drag of the skinning blade on the hogside. This is because of the slippery characteristics of the gripped hogside and its tendency to readily slip out of the clamp, and also because of the uneven edge of the hogside so that only a portion of the edge is effectively positioned between the jaws of the clamp. Only one such "pull-out" in several minutes of operation causes an intolerable "bottle neck" in the packing house production line. Consequently, if double hogsides are to be skinned in packing houses to supply the footwear manufacturer with whole pigskins, there has to be a clamp that will grip only a narrow portion of the belly along the teat strip, will not clamp the valuable bacon adjacent the teat strip, and yet will dependably hold the double hogside effectively while it is completely skinned.

Therefore, it is an object of this invention to provide a unique skinning apparatus and particularly a unique skinning machine clamp that forms an effective grip on the belly edge of the hogside on the narrow teat strip without requiring a grip also on the adjacent valuable bacon material.

It is another object of this invention to provide a unique skinning machine clamp capable of effectively gripping the teat strip of a whole hogside even though the edge is uneven, and only partially in the clamp.

It is another object of this invention to provide a double acting skinning machine clamp having a narrow, but extremely effective bite on the slippery hogside, coupled with automatic release of the final skin after completion of the skinning operation.

It is another object of this invention to provide a skinning machine clamp that can also be effectively used for single hogsides with no modification, to grip the hogside along the fatback area.

Still another object is to provide a skinning machine capable of high speed, dependable operation, and accuracy for clamping and skinning either single or double hogsides repeatedly, hour after hour, without allowing the hogside to pull loose from the clamp by slipping out or by tearing.

These and several other objects of this invention will become apparent upon studying the following specification in conjunction with the drawings in which:

FIG. 1 is a perspective view of the input side and one end of the skinning machine of this invention;

FIG. 2 is a perspective view of the output side of the machine illustrated in FIG. 1;

FIG. 3 is an enlarged, fragmentary, perspective view of the opposite end of the machine illustrated in FIG. 1;

Figure 13:
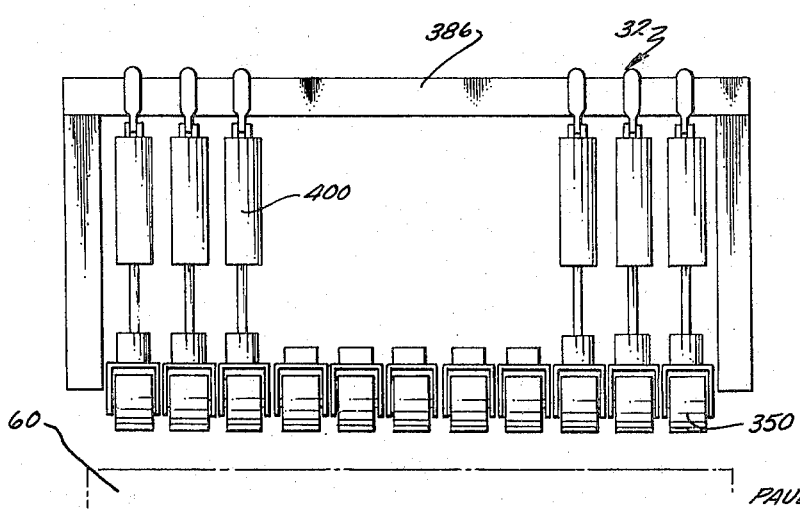
FIG. 13 is a perspective view of one form of special hold-down roller control mechanism.

Referring specifically to the drawings, basically the skinning machine assembly 10 includes a framework subassembly 12, a drum subassembly 14 having a drive subassembly 16, a clamping subassembly 18 on the drum, a blade supporting and control shifting subassembly 20, a hold-down roller subassembly 22, an operational sequence control subassembly 24 (FIG. 11), a clamp actuating subassembly 26 (FIG. 3), an air control subassembly 28 for the clamping cylinders, and a pressure roller control subassembly 30. In addition, an alternate pressure roller control subassembly 32 is shown in FIG. 13.

The framework 12 may take any of several suitable forms, being merely a supporting mechanism for all of the components of this assembly. It is shown in its simplest form in the drawings to prevent further confusion of the complex mechanism. It includes a plurality of four upright legs 40, 42 (FIG. 1), 44 and 46 (FIG. 2) with interconnected cross braces 48, 50 (FIG. 1), 52 (FIG. 2), and other supplemental vertical and horizontal supports, e.g., 54, 56, 58 (FIG. 3) to mount the various elements. The framework is of conventional steel construction formed of channel iron, square beams, plates, and so forth.

Figure 4:
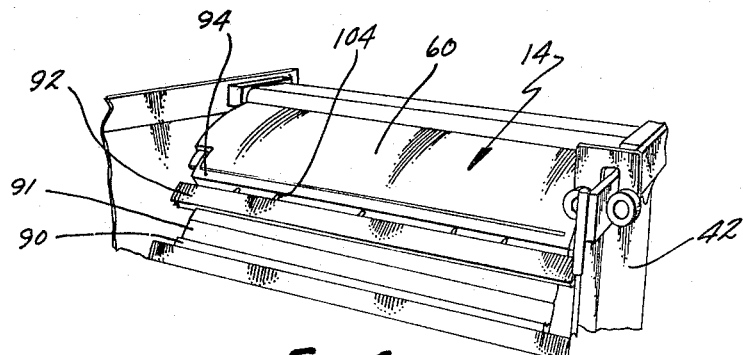
FIG. 4 is a fragmentary perspective view of the hogside clamping mechanism on the drum showing the clamp in its full open position.
Figure 5:
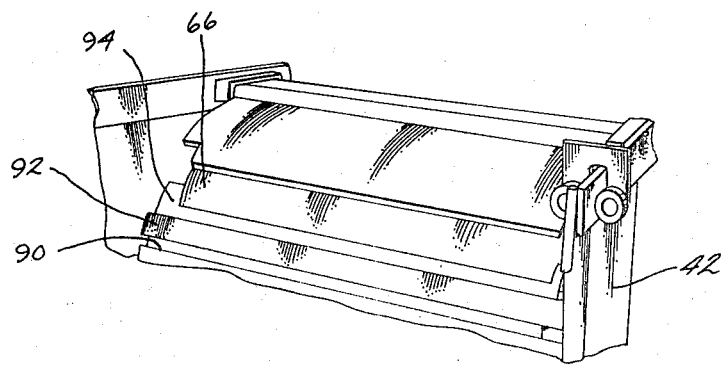
FIG. 5 is a fragmentary enlarged perspective view of the clamping mechanism in FIG. 4 showing the clamp in its fully closed position.
Figure 6:
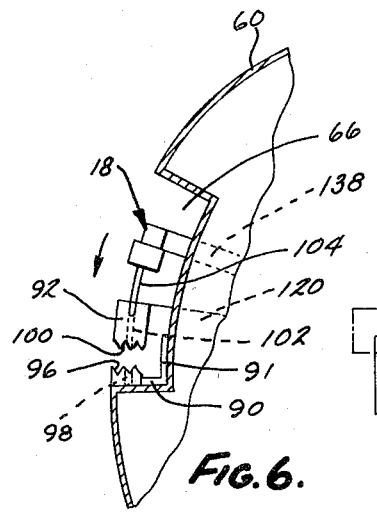
FIG. 6 is a sectional, enlarged, elevational view of a portion of the drum and clamping mechanism while closed.

The drum subassembly 14 comprises a generally cylindrical element, normally formed of steel construction, preferably stainless steel for sanitary purposes. It has a diameter of three to five feet. Since it is specifically designed to accommodate double hogsides, and since large hogs can have a considerable circumference, the drum must be sufficiently large to accommodate these. It is normally formed of a thick peripheral skin 60 (FIG. 6) and a pair of end plugs 62 (FIG. 2) and 64 (FIG. 3) to seal the ends and provide a rigid construction. In the periphery of the drum, extending axially of the drum, is a ditch or notch 66 (FIGS. 1 and 6) several inches in its arcuate extent and normally extending from one end of the drum to the other. The drum is rotatably mounted on a pair of end shafts 70 (FIG. 8) suspended in bearings 72 (FIG. 8) and 74 (FIG. 3) attached to the framework.

The drum is rotatably driven by a drive mechanism 16 including an electrical motor 78, a gear box reduction mechanism 80 having an output shaft which drives a chain 82. This chain in turn engages sprocket 84 on the drum shaft to rotate it. Obviously, this particular drive mechanism may be substituted by an equivalent mechanism without departing from the invention as will be understood from the description that follows.

Positioned within notch 66 is a hogside clamping subassembly 18. This clamping subassembly is particularly unique in providing an effective gripping action for the belly portion of the double hogsides, while only taking a relatively small "bite" on the skin and attached meat. As will be understood hereinafter, however, the clamp is also equally effective on single hogsides, for gripping the fatback area where the hog is split along the backbone. The clamp itself includes three essential components—a lower, fixed, elongated, gripping jaw 90 on one arcuate side of the ditch, a second, elongated, shiftable, cooperating gripping jaw 92 intermediate the two arcuate sides of the notch, and an anchor clamp bar 94 shiftable with the second jaw, and shiftable with respect to both the first and second jaws.

The lower jaw 90 extends from end to end in the drum and may be attached by its flange 91 to the drum. It has a plurality, preferably three, elongated teeth-type ribs 96 which extend its length for effective gripping action. It also includes a plurality of small pin-receiving recesses 98 spaced longitudinally along its length.

The second jaw 92 also extends the length of the drum, and is positioned to cooperate with the first jaw. Specifically, it includes a plurality of teeth-type gripping ribs 100 which interengage with or intermesh with teeth 96 of the first jaw, to grip a hogside when the clamp is closed. It likewise includes a plurality of orifices 102 extending clear through the depth of the clamp from top to bottom, coinciding with orifices 98 in the lower jaw.

The anchor bar 94 likewise extends the length of the clamp or substantially thereto, and includes a plurality of spaced puncture pins 104 positioned at spaced intervals to fit into openings 102 and down through the hogside slightly into the recesses 98 in the lower jaw.

Figure 7:
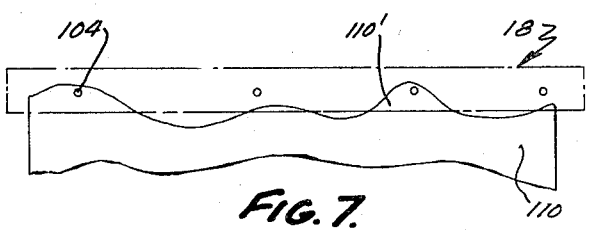
FIG. 7 is a fragmentary plan view of a section of skin showing its relationship to the clamp.

The three elements, when shifted together, cooperate effectively to grip a narrow section along the belly of the hogside (illustrated schematically in FIG. 7) and specifically along the teat strip edge. That is, the two clamps effectively grasp those protruding portions 110' of the hogside 110 (FIG. 7) which project within the confines of the gripping jaws. The severed edges of the belly are often very irregular in configuration as illustrated in slightly exaggerated fashion in FIG. 7. The puncture pins 104 pass through the hogside to secure a very effective grip on the small edge portion, even though the bite is relatively narrow (about 1½") compared to the very deep bite (about 3–4") regularly taken by conventional skinning machines. When the jaws are closed for this clamping mechanism, both jaw 92 and anchor bar 94 are shifted simultaneously. Likewise, they both open practically simultaneously. The withdrawal or retraction of the pins when pulled back through openings 102 effectively wipes off the pigskin from the gripper. The pins pull out of the skin using jaw 92 as a wiper. The elements, therefore, not only cooperate uniquely when clamping the skin, but also cooperate uniquely when releasing the skin after the operation is completed.

Figure 8:
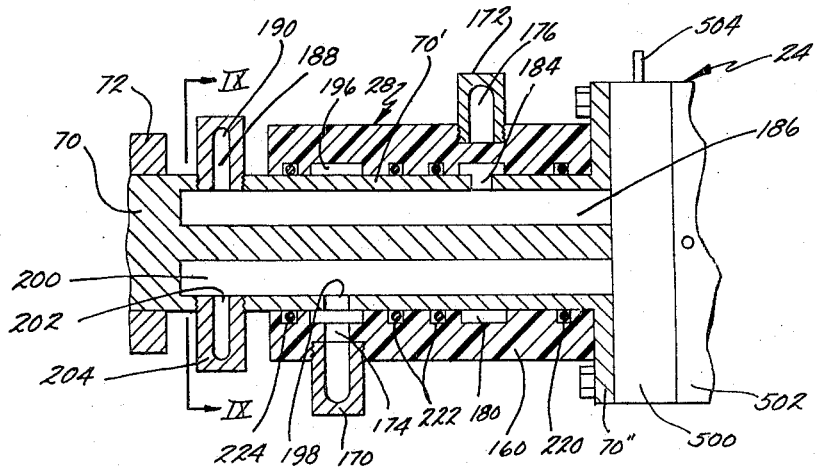
FIG. 8 is a sectional enlarged fragmentary view of the air supply system to the cylinders controlling the clamping mechanism.
Figure 9:
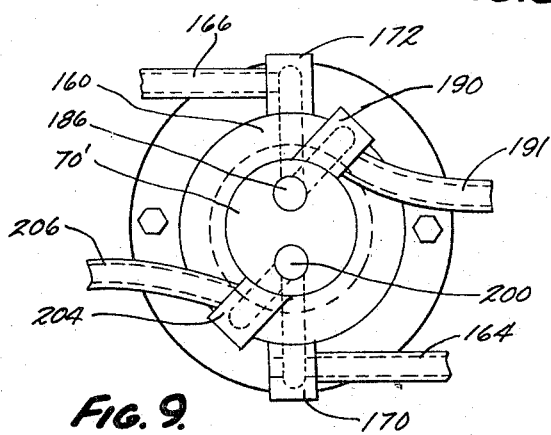
FIG. 9 is a sectional view taken on plane IX—IX of FIG. 8.

Actuation of the clamping mechanism utilizes the apparatus shown more specifically in FIG. 3 and in FIGS. 8 and 9. As stated previously, lower jaw 90 is fixed in the ditch. The upper jaw 92 has its opposite ends supported on a pair of arms 120 (FIG. 3) and 122 (FIG. 1). These arms are attached at their radially outer ends to the jaw and are pivotally attached at the radially inner ends to the drum at 124. This pivotal mount may be either coaxial with the rotational axis of the drum or may be eccentric to the axis of the drum. Operating this pair of arms is a pair of fluid cylinders, including cylinder 128 (FIG. 3) and a like fluid cylinder on the opposite end of the drum. Each of these fluid cylinders has one end affixed to the drum and the opposite end attached by means of a clevis 130 intermediate the ends of the individual arms 120 and 122. Extension of the cylinders, therefore, shifts the movable jaw away from the fixed jaw, while contraction of the cylinders shifts the movable jaw toward the fixed jaw to clamp them together.

Attached to each of the arms 120 and 122 is a pair of extended mounting brackets or mounts 134 (FIG. 3). These are affixed to arms 120 and 122. Pivotally attached to these mounts at 140 is a pair of second end arms, i.e., arm 138 on one end of the drum and a like arm on the opposite end of the drum. This pivot mount is at one end of these arms, with anchor bar 94 being attached to the other ends of the arms. Movement of these arms allows the anchor bar to be shifted with respect to the movable jaw. However, movement of the movable jaw also carries along this apparatus with it. Extending between each of arms 138 and each of mounts 134 is a second pair of fluid cylinders, i.e., cylinder 146 and a like cylinder on the other end of the drum. This pair of fluid cylinders shifts arms 138 with respect to the mounts, and therefore moves the anchor bar toward or away from the movable jaw and the fixed jaw.

Normally, as will be understood more specifically hereinafter, the fluid cylinders for the movable jaw and the fluid cylinders for the anchor bar are operated simultaneously to close the jaws and to cause the anchor bar to engage into a completely interengaged assembly, or alternatively, to open the three elements from each other. It will be realized that with the specific arrangement of the fluid cylinders 146 and 128, for example in FIG. 3, to do this, cylinder 128 must extend while cylinder 146 contracts, and cylinder 128 must contract while cylinder 146 extends. This can be readily achieved by connecting a common hose to the lower end of cylinder 128 and the lower end of cylinder 146, and making a common connection to the upper ends of cylinders 128 and 146. Consequently, compressed air is either allowed to shift the cylinders simultaneously in one direction or the other. Since the operating mechanism on the opposite end of the drum would appear like a mirror image of FIG. 3, this is not shown.

Control of this compressed air to the cylinders is achieved through the control system explained with respect to FIG. 11 hereinafter. The air is supplied to these cylinders, which revolve with the drum, by the mechanism illustrated in FIGS. 8 and 9. Referring specifically to FIG. 8, the air supply subassembly 28 adjacent the timer control subassembly 24 includes the bored out end 70' of shaft 70, and a surrounding annular plastic sleeve 160. Air from a four-way, solenoid, control supply valve 162 (FIG. 1) is supplied through air hoses 164 and 166 (FIG. 1) to fittings 170 and 172 (FIG. 8), respectively, to communicate to passageways 174 and 176, respectively, drilled through the periphery of annular element 160. Passageway 176 communicates with an annular passage 180 in the plastic sleeve around the shaft. This annular passageway communicates with shaft passage 184 that leads into the drilled out cylindrical passageway 186. This passageway 186 likewise leads to passage 188 to outlet fitting 190 mounted on shaft portion 70' to revolve with the unit. This fitting communicates with a hose 191 which divides to supply air to the lower end of the cylinders 146 and 128, and the like pair of cylinders on the opposite end of the drum.

In a similar manner, passage 174 through housing 160 communicates with annular passage 196 around shaft portion 70', which communicates with a through passage 198 drilled through the extended shaft portion, into the cylindrical, axially extending passage 200. This passage 200 communicates through a drilled opening 202 to hose fitting 204. A hose 206 is connected to this fitting and divides into two passageways going to the upper ends of cylinders 128 and 146, and the upper ends of the two like cylinders on the opposite end of the drum. A plurality of O-rings 220, 222, and 224 seal the respective passageways to prevent blow between them during rotation of shaft section 70' inside sleeve 160.

Hogsides are fed into one side of the machine when the clamping mechanism is at a "9 o'clock" position (when viewed from FIGS. 1, 10 and 12) by feeding them in on a suitable conveying means 220 (FIG. 1), preferably cooperating with a powered roller conveyor adjacent thereto. This roller conveyor mechanism 220 may be mounted with one end resting on the framework 12, and the opposite end supported by a U-shaped inverted brace 222 having its lower ends attached to frame legs 40 and 42 by brackets 224 and 226.

Positioned above the drum on a horizontal plane with its sharp edge approximately dead center at "12 o'clock" over the horizontal drum axis is the skinning blade 230. This blade is an elongated element with a sharp edge spaced a small fraction of an inch from the peripheral cylindrical surface of the drum, as illustrated for example in FIG. 10. The blade itself is supported by having its ends in a pair of mounting supports, each comprising a first L-shaped element 234 with a flange portion 236 underlying the end of the knife, and a cooperating bracket 238 having a tightening nut 240 to push the blade into its mount. Flange 242 of bracket 238 also underlies a portion of the end of the blade to secure it. These bracket mounts are in turn affixed to a pair of parallel straddling arms 248 and 250 (FIGS. 1 and 10) on opposite ends of the drum.

Figure 10:
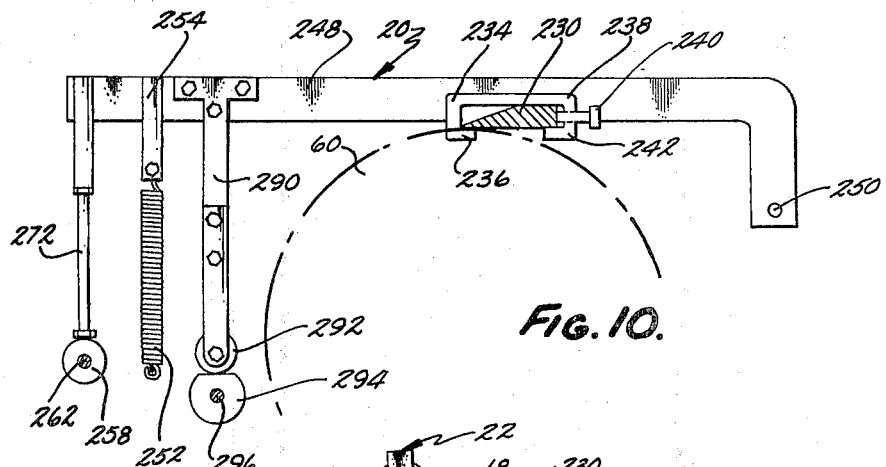
FIG. 10 is a fragmentary enlarged view of a portion of the blade support and shifting mechanism for the novel skinning machine.

Each of these straddling arms may be generally L-shaped in configuration as shown in FIG. 10, having its short leg extending vertically downwardly on one horizontal side of the drum and its long leg extending past the drum to the opposite side. The short leg of each arm has its lower end mounted on a pivot 250 to the framework, so that shifting of the opposite end will vertically move the blade slightly with respect to the drum surface. A tension coil spring 252 attached to the opposite end of the arm by a bracket 254, and having its lower end secured to framework 12, applies a biasing tension downwardly on the long leg of each arm to pull the mechanism down against a stop means. This stop means preferably is in the form of a pair of cams 258 (FIG. 10) and 260 (FIG. 1). These cams are mounted on a common horizontal shaft 262 (FIG. 1). The shaft is supported in a pair of bearings 264 and 266 (FIGS. 1 and 3) attached to legs 40 and 42, respectively, of the framework. These cams can be rotatably moved or revolved by rotation of their shaft 262, using a manual crank 270 and an intermediate gear box 268. Since the lower ends of studs 272 (FIG. 10) and 274 (FIG. 1) rest upon these cams and have their upper bracketed ends attached to arms 248 and 250, operation of crank 270 causes slight vertical manual adjustment of arms 248 and 250, and thus slight vertical adjustment of tiny fractions of an inch to the blade edge with respect to the drum to shift it away or toward the drum. Also, automatic cutting depth control is achieved over this blade. To do this, a hoisting mechanism is used, which includes a pair of depending brackets 290 on opposite ends of the unit, attached to both of the arms 248 and 250. Both of these brackets are alike, and include a follower wheel 292 on the lower end engaging a cam 294 mounted on a shaft 296. Attached to both ends of shaft 296 is a pair of levers 298 (FIG. 3) which extend radially of the shaft. Arcuate shifting of these levers, therefore, revolves cam 294 slightly to cause the cam followers 292 to move from the flat surface on the cam peripheries (FIG. 10) to the adjacent curved, raised surfaces. This causes the arms to momentarily pivot and raise the knife edge with respect to the drum.

This shifting of levers 298 is achieved through a pair of extensible fluid cylinders 300 having their rods attached to the levers and their other end affixed to the framework (FIG. 3). Since these two cylinders and two levers 298, as well as brackets 290, are identical on both ends of the apparatus, only one is shown for purposes of convenience in FIGS. 3 and 10. Cylinders 300 are supplied with controlled amounts of air, to either one end or the other, by a pair of hoses 304 and 306 (FIG. 3) from a four-way solenoid valve 308 controlled by the circuit in FIG. 11 in a manner to be described.

Figure 12:
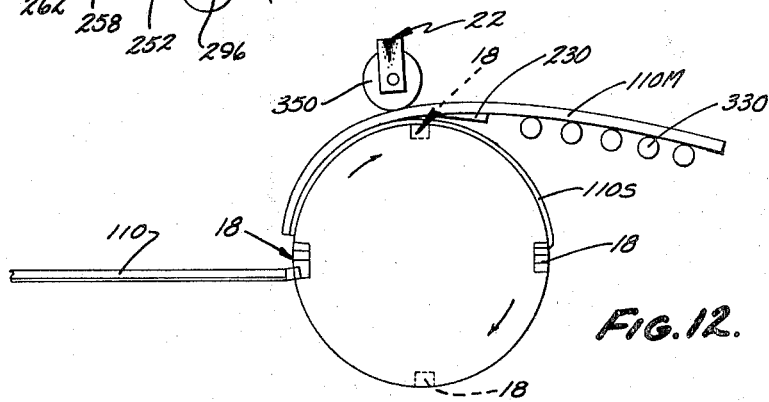
FIG. 12 is a diagrammatic illustration of the skinning operation.

During the skinning operation, the drum moves 360 degrees, or one revolution, under normal conditions and stops. However, it is possible to cause the drum to continuously revolve in a manner to be described. For purposes of convenience in describing the apparatus, a 360 degree rotation is considered a complete skinning operation. Referring to FIG. 12, the clamping mechanism ordinarily starts and stops at the "9 o'clock" position. The hogside 110 can then be fed into the open clamping mechanism 18. With closing of the clamp by actuation of cylinders 128 and 146, the upper jaw shifts and the two jaws grip the inserted teat strip portions tightly between the elongated teeth or ribs. The anchor bar shifts against the upper jaw and pushes the anchor pins down through the gripped strip. Either the narrow clamp alone, or the anchor pins alone, is not sufficient to hold the thin hogside teat strip skin since it will slip out of the former and will tear loose from the latter. However, it has been found that the described unique combination of the two achieves an outstanding and completely reliable holding means, so that even though the belly skin is considerably stretched during the hard pull, it does not slip out or rip off. In fact, the stretching that occurs is believed to achieve even better skinning since it widens and flattens the skin pores containing fat to be removed. It will be realized that this gripping problem is ordinarily not encountered with skinning single hogsides since the fatback area normally gripped is very tough and thick, and relatively free of stretching or tearing tendencies. It can also be gripped with a wide jaw without loss of valuable products. Upon closing of the clamp, the drum begins to revolve. Since the skinning blade 230 is at the "12 o'clock" position with respect to the drum, the skinning operation begins after the drum has moved about 90 degrees. The skin 110S then moves around with the drum periphery while the meat 110M passes up over the knife surface and onto the discharge conveyor mechanism 330, shown more specifically in FIG. 2. This discharge conveyor may comprise a roller conveyor of segments 330' and 330" leading to the next portion of the meat packing line. It is supported on the framework by braces 334 as in the manner illustrated in FIG. 2.

Referring again to FIG. 12, the skinning operation continues to completely separate the meat from the skin as the drum makes a complete revolution. Ordinarily, when the drum has moved about 180 degrees, so that the clamping mechanism is at the "3 o'clock" position, the skinning operation is substantially half completed when skinning double hogsides. (When skinning single hogsides, the skinning operation is practically complete at this point.) When skinning double hogsides, the skinning operation is completed after the drum has moved approximately 270 degrees, so that the clamping mechanism is at "6 o'clock." The clamp is then opened, causing the skin to drop into a container (not shown) underneath the skinning apparatus, while the drum continues to rotate until the clamp moves again to the "9 o'clock" position where the drum stops.

As stated previously, the unique clamp not only has unusual holding capacity on the belly strip, but also has an automatic positive skin release when opened. The separation of the anchor bar with the upper shiftable jaw causes withdrawal of the anchor pins back through the jaw orifices and thus out of the skin, causing it to be wiped off the upper jaw. It will be realized that the skin does not hang-up in the recesses of the lower jaw since the initial withdrawal of the pins pulls the skin away with it to free it from the fixed jaw, with the upper jaw then wiping it off the pins. The result is complete reliability of skin discharge.

The skin furthermore has very little flesh left on it to be removed by "fleshing." One reason is because the meat along the teat strip is very thin so as not to form a thick, tough, resulting "wedge" as occurs along the fatback when it is gripped according to prior technology.

During this skinning operation the hold-down roller subassembly 22 is in operation to press the hogside directly against the drum periphery by rollers 350 before it passes into the blade. The hogside must be pressed directly against the drum because the blade is only a small fraction of an inch off the drum periphery. If the hogside is raised off the drum surface, the blade will slice into the skin and leave rind on the meat, or even through the skin, causing disruption of the entire operation. These hold-down rollers are in the form of a plurality of similar adjacent rollers, for example the eleven rollers illustrated in FIG. 1.

Each of the rollers 350 is rotatably mounted within a generally U-shaped, inverted bracket 352. Each is attached to one end of a leaf spring 354, i.e., one leaf spring for each roller. The leaf springs extend generally tangential to the drum, in the direction of rotation of the drum, and have their opposite ends fixedly attached to a common support bar 358 (FIG. 2). This support bar has its ends mounted in bearings 360 and 362 which are in turn attached to the framework. Intermediate the ends of the leaf springs, extending transversely thereof and attached underneath them is a second support bar 370. When this second support is vertically shifted, the leaf springs and rollers move with it. This enables the rollers to be shifted toward or away from the skinning drum to vary their pressing action. Both ends of support 370 are mounted in sleeves 374 and 376 (FIG. 2).

Operably connected to these sleeves is a pair of fluid cylinders 380 and 382 having their lower ends attached thereto and their upper ends affixed to a portion of the framework, specifically overhead bar 386. Actuation of these cylinders lifts or lowers the pressure rollers on a controlled basis.

In order to accommodate the double hogsides, it has been found to be important to bias the outer rollers, specifically the three outside rollers on each end in the form of the invention illustrated, with substantially greater biasing force towards the drum. This is because the side portions of the hog tend to curl up, especially after the hogsides have been stored in a cooler over a weekend. If this curl is allowed to remain when the hogside passes the skinning blade, portions of the skin will be severed and remain on the valuable bacon product so that detailed, careful, manual removal by a skilled meat cutter is necessary. It has been found, however, that by weighting these rollers with a weight bias, for example, of about twice the central rollers, this problem is overcome. For example, if the center rollers have a weight bias of about 13½ pounds and the outer rollers have a weight bias of about 27 pounds, the hogside is neatly skinned.

Even with this construction, however, when the underarm portions of the hogside are allowed to remain on the unit by meat packers who do not sever this before skinning, these sections tend to curl up and be severed to leave a portion of skin on the meat. It has been found that this can be effectively controlled utilizing the apparatus in FIG. 13. With this apparatus, each of the outer pressure rollers 350, specifically the outer three on each side, is provided with a fluid cylinder 400 extending between overhead support 386 and the individual brackets of the rollers. The five center rollers are mounted on their leaf springs. The outside rollers, mounted on their leaf springs, also have this auxiliary force supply for each one, so that the exact amount of bias applied by the pressure rollers to the hogside can be greatly increased and controlled. Therefore, when a hogside having underarm portions approaches the skinning blade, the mechanism automatically trips a switch to actuate a solenoid valve which supplies air to these fluid cylinders to actuate them and push the hogside against the drum. This can be controlled according to drum rotation in a manner to be explained hereinafter with respect to the circuitry. Using this mechanism, the underarm skin portions, as well as the remainder of the hogside, are pressed firmly against the drum to move smoothly past the skinning blade without severing a chunk of skin to remain on the meat.

Figure 11:
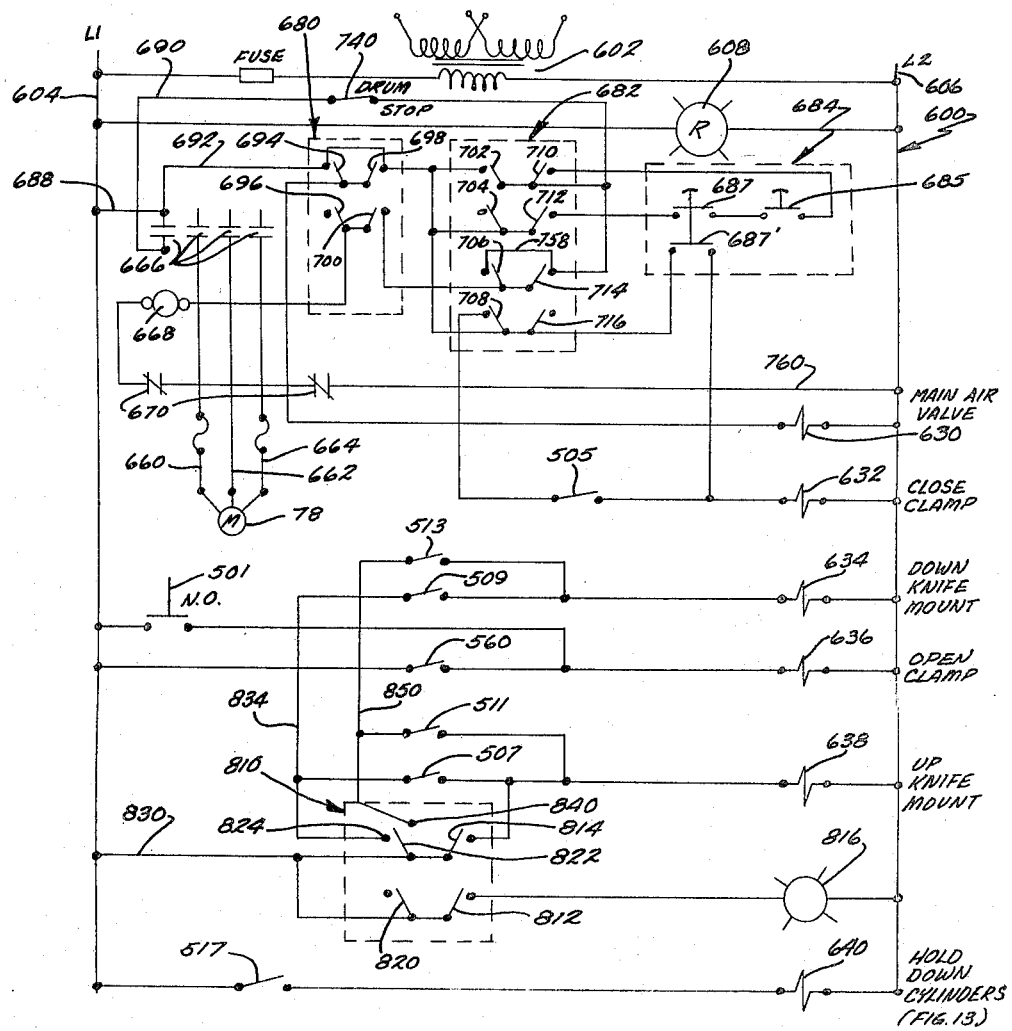
FIG. 11 is a schematic wiring diagram of the control system for this skinning machine.

Referring now to FIG. 11, the control of the system is substantially as follows. The operation of each of the components is regulated according to drum rotation. This is achieved, for example, by attaching rotational switch actuator camming elements 500, 502, etc., on the end of shaft portion 70' by bolting them to a flange 70", so that the timing control cams are rotatably driven with the shaft. Each of these cam discs includes one or more radially extending, switch actuating pins 504 (FIGS. 1 and 8) to selectively actuate a plurality of microswitches 506. Each microswitch is positioned to cooperate with one of the timing cam segments. These radially extending cam fingers are positioned at a particular chosen circumferential location on the drum to actuate their respective limit switch after the skinning drum has moved into a particular rotational position in its cycle. The location of these pins will be readily understood from the description of the operation of the switching mechanism in FIG. 11.

The control circuitry 600 includes a suitable transformer power supply 602 between bus lines 604 and 606. To indicate operative condition of the circuit, an indicating light 608 is provided across the lines. It will be realized from the description of this circuitry that various other circuit arrangements may be employed for similar results. Also, it may be modified somewhat if certain of the elements which are desirable but not essential are removed from this mechanism. In the preferred form of the invention, however, the circuit includes solenoid-type air valves to control the clamp, the knife lifter, preferably the main air valve, and preferably the hold-down cylinders in FIG. 13. Since solenoid controlled four-way valves are common, it is not believed necessary to illustrate the exact construction thereof. Rather, in the circuitry, these are illustrated schematically as solenoids. Thus, solenoid 630 controls the main air valve to the entire apparatus. Solenoid 632 controls the valves to the cylinder ends to close the clamp mechanism. Solenoid 634 controls the valve to lift the knife by controlling cylinders 300 (FIG. 3). Solenoid 636 controls the opposite end of the valve that solenoid 632 controls to supply air to the opposite end of the cylinders and open the clamp mechanism. Solenoid 638 controls the opposite end of the four-way valve that solenoid 634 controls, to send air to the opposite end of the cylinders to lift the knife mount. Solenoid 640 controls the valves to the hold-down cylinders used in the modified form in FIG. 13.

The clamp opening solenoid 636 is connected across lines 604 and 606 in series with a microswitch 500, to cause the clamp to open after the drum makes an arcuate movement of about 270 degrees to release the skin. A hand-operated, normally open switch 501 is in parallel around the microswitch 500 to allow the clamp to be opened in case of an emergency or in case of malfunction, to release the skin. The switches shown open are normally open, and the switches shown closed are normally closed.

The drum drive motor 78 is connected by three lines 660, 662 and 664 through the four contacts 666 of a starter switch mechanism of conventional type. The starter also includes a holding coil 668 in series with a pair of overload coils 670. With the circuitry shown, two selector switches 680 and 682 are shown for alternate operation of the drum drive, as well as a two hand drum start switching assembly 684. The motor 78 is thus connected with line 604 by lead 688, and is connected with line 606 through its starter switch contacts by one of a parallel set of leads 690 and 692. The selector switches 680 and 682 may be of the rotational type such that the switch levers 694 and 696 of switch 680 are closed, levers 698 and 700 are open, or vice versa. Likewise, if levers 702, 704, 706 and 708 are closed, levers 710, 712, 714 and 716 are open, or vice versa. When switch 680 is thrown to the left to make contacts to levers 694 and 696, only the main air valve solenoid 630 is actuated, not the drive motor, since the circuit is completed only through leads 604, 688, 692, lever 694, lead 720, solenoid 630, and lead 606. Lever 696 of switch 680 is then dead. If, on the other hand, selector switch 680 is thrown to the right to make contacts through levers 698 and 700, the main air valve is actuated and the motor drive is prepared to be actuated. The main air valve is actuated through the same sequence just recited except through lever 698 instead of lever 694. Switching of selector switch 680 to the right does not actuate the motor immediately, but only prepares the circuit so that by actuation of switch 682, the motor will operate. If selector switch 682 is shifted to the left, the drum drive is operated continuously so that the motor keeps operating until the drum is stopped. If, however, the selector switch 682 is shifted to the right, the motor will drive the drum one revolution, at which time the drum "stop" microswitch 740 is opened from its normally closed position by an appropriate pin on a rotating camming disc, to stop the mechanism until it is restarted for another revolution.

Thus, after the unit has made one revolution, when selector switch 682 is thrown to the right, the drum switch 740 is opened to stop the mechanism. The closing clamp solenoid 632 is also actuated when levers 708 and 716 of selector switch 682 are in either position, i.e., continuous drive or one revolution, through the sequentially actuated lower portion 687' of switch 687 to its control microswitch 505. The clamp is thus closed with pushing of the hand button, but microswitch 505 opens after a predetermined rotational angle of about 270 degrees, just prior to actuation of microswitch 500, to positively open the clamp mechanism. This slight delay prevents the opposite ends of the clamp control cylinders from conflicting.

Another selector switch 810 is employed with respect to the control of the knife lifting mechanism through solenoid valve 308 and cylinders 300 (FIG. 3) that actuate the levers and camming mechanisms for pivoting the knife support arms (FIG. 10). Thus, when selector switch 810 is thrown to the right so that switch levers 812 and 814 are closed, the indicator light 816 is lighted, and the knife is continuously held in a slightly raised position approximately $\frac{1}{16}$ to $\frac{1}{32}$ of an inch above its normal position. This extended knife elevation is especially desirable after a weekend since the hogsides retained in cold storage are chilled clear through and do not readily conform to the drum configuration. Therefore, it is desirable to shift the blade slightly away from the drum to account for this so that the blade will not slice down into or through the skin layer as the drum rotates. After these excessively chilled hogsides are handled, and normal hogsides are again encountered, the selector switch 810 is thrown to the left so that contacts 820 and 822 are closed. Lever 820 will contact terminal 824 so that a connection is made from line 604 through lead 830, lever 822, contact 824, lead 834, and thence to microswitch 507 to solenoid 638 for lifting the knife mount, and microswitch 509 to solenoid 634 to lower the knife mount. The two solenoids 634 and 638 are actuated independently and at different time intervals by the pins on the rotating cam mechanism 24 so that they will not conflict.

When skinning double hogsides, microswitch 509 is normally held closed during almost the entire 360 degree interval of rotation. The microswitch 507 is closed only momentarily (while switch 509 is opened momentarily) to raise the knife blade the $\frac{1}{32}$ to $\frac{1}{16}$ of an inch while the backbone portion of the double hogside is passing the skinning blade. This would normally occur, when the mechanism has rotated to substantially the position illustrated in FIG. 12, when half of the hogside has passed the skinning blade. Normally, the drum has at this time moved approximately 180 degrees from its initial position so that clamping mechanism 18 is at approximately a "3 o'clock" position. It has been found that this momentary, slight raising of the blade just as the center of the back passes the blade very effectively allows transition of this portion of peculiar characteristics without the knife slicing through the skin to partially or totally sever one portion from another. Without this raising, extreme difficulties are encountered, even with slight severance, since the skin will pull loose, or shift sideways and curl, just as two examples.

Referring back now to FIG. 11, it will be noted that the lever 822 also can be placed into contact with a second contact 840 to complete a circuit from line 604, through lead 830, lever 822, contact 840, lead 850 and thence through the parallel microswitches 511 and 513, alternately, to actuate solenoids 638 and 634, respectively. It will be noted that these microswitches are in parallel with microswitches 507 and 509 to operate the knife mount solenoid valves.

The purpose of this is to enable a single hogside to also be skinned on the same machine. When skinning a single hogside, it is desirable to momentarily raise blade 230 after the drum has rotated only about 90 degrees, and just as the blade is to slice into the hogside. This is because the hogside is gripped along the fatback in this instance, where the skin is the thickest. Therefore, the blade must be lifted momentarily to move into this thicker skin portion and then ride slowly down the tapered portion under the force of the blade biasing springs to the thin belly strip. Consequently, the separate microswitches 511 and 513 are utilized. These are actuated to open switch 513 and close switch 511 momentarily while the skinning starts, and then subsequently, to open switch 511 and close switch 513 to allow the knife to again move down. While it is conceivable that mechanical mechanisms could be utilized to achieve this same action, and this is within the broader concept of this invention, it is preferable to do this by the mechanism shown.

When employing the optional solenoid valve 640 for the special air cylinders illustrated on the rollers in FIG. 13, another microswitch 517 is employed to connect the circuit between the lines 604 and 606 on a controlled basis just as the hogside moves under the pressure rollers and prior to its movement into the blade. This switch may be controlled by a rotating cam disc to be closed for approximately 90 to 180 degrees of the drum rotation as desired.

The very brief operation of the apparatus is thus as follows:

A single or double hogside is fed into the unit as necessary. With a double hogside, if a test of the air system is to be made, selector switch 680 is thrown to the left and the test is made. If the unit is to be operated on a single revolution basis, selector switch 680 is thrown to the right and switch 682 is thrown to the right. When the hogside belly strip is between the jaws of the clamp, push buttons 685 and 687 are closed to actuate the clamp closer, causing the jaws to come together and causing the anchor pins to puncture the teat strip. At the same time, the drum begins to revolve and pulls the hogside past the skinning blade. When the hogside has its backbone adjacent the blade, normally after about 180 degrees of the drum rotation, the blade lifts momentarily to move past the thick, tough, backbone area. It then lowers again and rides down the skin to the teat strip until the skinning is complete. After the drum rotates about 270 degrees, the clamp opens, allowing the skin to drop into a suitable container, with the meat previously having passed over the conveyor mechanism illustrated in FIG. 2.

If the hogsides have been chilled over a weekend, and the blade must be lifted during the entire revolution, the selector switch 810 is thrown to the right. At other times, it is thrown to the left so that the momentary blade lifting occurs.

If single hogsides are to be skinned, however, selector switches 680 and 682 are again shifted to the right, or in usual circumstances, selector switch 682 is shifted to the left for continuous drum rotation, and selector switch 810 is shifted to the middle so that lead 850 is placed in the circuit. This causes the knife to lift momentarily after about 90 degrees of drum rotation to receive the thickest fatback portion in the clamp. The unit is operated by pressing the palm buttons to begin the rotation. In either case, after the drum has rotated 360 degrees, it stops because of opening of the drum switch on the timer controlled basis.

If the blade is cutting too deep or not deep enough for the particular type of hogs being butchered, it is manually adjusted by the crank mechanism illustrated in FIG. 1 and FIG. 10. It can thus be controlled to thousandths of an inch very readily.

Actual operation of the described mechanism to repeatedly skin double hogsides, or alternatively, to skin single hogsides, has proven its complete dependability and practicality as far as being a versatile, automated machine capable of operation by meat packers with no mechanical skill. It is realized that the particular details of this complete structure, shown in its preferred form, and which has proven to be very dependable, could be modified to suit particular packing houses, production line set-ups, type of hogs, or butchering methods encountered, without departing from the basic concepts set forth herein. Consequently, this invention is not to be limited to this exact form of detailed construction shown, but only by the scope of the appended claims and the reasonable equivalents thereto.

I claim:

1. In combination in a hog skinning machine having a rotatably driven drum, an elongated notch endwise in the drum periphery, and hogside clamping means in said notch; said clamping means comprising three elongated cooperative elements, one of said elements being a fixed jaw, the second being an orificed jaw shiftable toward and away from said fixed jaw to grip a hogside therebetween, and the third being a shiftable anchor bar having a plurality of puncture pins projectable through said orificed second jaw when shifted toward said second jaw to anchor a clamped hogside, and retractable therefrom when shifted away from said second jaw to wipe the hogside skin from the clamping means; and means to shift said second jaw toward and away from said first jaw, and means to shift said anchor bar toward and away from said second jaw.

2. In a hog skinning machine having a rotatably driven skinning drum, an elongated notch extending from end to end of said drum, and a clamping mechanism in said notch; said clamping mechanism including a first fixed elongated jaw on one side of said notch; a second shiftable elongated jaw facing said first jaw and positioned to cooperate with said first jaw to form a gripping action therebetween; said second jaw having a pair of radially extending pivot arms on its opposite ends, with one end of each arm attached to said second jaw and the other end of each arm pivotally attached at the ends of said drum, actuating means extending between the intermediate portions of said arms and said drum to shift said second jaw toward and away from said first jaw; said arms having mounts; a third elongated anchor bar in said notch adjacent said second jaw and shiftable with respect thereto; a pair of end arms having one end attached to the opposite ends of said bar and having the other ends pivotally attached to said mounts; actuating means extending between said mounts and said end arms to shift said bar toward and away from said first and second jaws; said mounts, second actuating means, end arms and anchor bar being shiftable with said pivot arms and second jaw, said bar having a plurality of hogside puncture pins extending toward said second and first jaws; said second jaw having a plurality of through-openings corresponding to said pins to allow said pins to extend therethrough into a hogside between said jaws when said bar is shifted toward said second jaw, to anchor the hogside in the clamp; and said pins being retracted back through said second jaw to wipe the hogside off the pins upon opening of said jaws.

3. In a hogside skinning machine having a rotatably driven skinning drum, an elongated notch extending from end to end of said drum, and a clamping mechanism in said notch; said clamping mechanism including a first fixed elongated jaw on one side of said notch, having a plurality of elongated gripping ribs, a second shiftable elongated jaw facing said first jaw and having a plurality of elongated gripping ribs positioned to intermesh with said first jaw ribs to form a gripping action therebetween, said second jaw having a pair of radially extending pivot arms on its opposite ends, with one end of each arm attached to said second jaw and the other end of each arm pivotally attached to the ends of said drum, extensible cylinder actuating means extending between the intermediate portions of said arms and said drum to shift said second jaw toward and away from said first jaw; said arms having side extension mount means; a third elongated element in said notch adjacent said second jaw and shiftable with respect thereto; a pair of end arms having one end attached to the opposite ends of said element and having the other ends pivotally attached to said extension mounts; second extensible cylinder actuator means extending between said extension mounts and said end arms to shift said element toward and away from said first and second jaws; said mounts, second actuating means, end arms, and element being shiftable with said pivot arms and second jaw, said element having a plurality of hogside puncture pins extending toward said second and first jaws; said second jaw having a plurality of through-openings corresponding to said pins to allow said pins to extend therethrough into a hogside between said jaws to anchor it when said element is shifted toward said second jaw; and said pins being retracted back through said second jaw to wipe the hogside off the pins upon opening of said jaws.

4. In a hogside skinning machine having a rotatably driven skinning drum, an elongated notch extending from end to end of said drum, and a clamping mechanism in said notch; said clamping mechanism including a first fixed elongated jaw on one side of said notch, having a plurality of elongated gripping ribs, a second shiftable elongated jaw facing said first jaw and having a plurality of elongated gripping ribs positioned to cooperate and intermesh with said first jaw ribs to form a gripping action therebetween, said second jaw having a pair of radially extending pivot arms on its opposite ends, with one end of each arm attached to said second jaw and the other end of each arm pivotally attached to the ends of said drum, a pair of extensible cylinder actuating means, each extending between the intermediate portions of one of said arms and said drum to shift said second jaw toward and away from said first jaw; said arms having side extension mounts; a third elongated element in said notch adjacent said second jaw and shiftable with respect thereto; a pair of end arms having one end attached to the opposite ends of said element and having the other ends pivotally attached to said extension mounts; a second pair of extensible cylinder actuator means extending between said extension mounts and said end arms to shift said element toward and away from said first and second jaws; said mounts, second pair of actuating means, end arms, and element being shiftable with said pivot arms and second jaw, said element having a plurality of hogside puncture pins extending toward said second and first jaws; said second jaw having a plurality of through-openings corresponding to said pins to allow said pins to extend therethrough into a hogside between said jaws when said element is shifted toward said second jaw; said pins being retracted back through said second jaw to wipe the hogside off the pins upon opening of said jaws; extended ported end shaft means on said drum mounted to rotate therewith and having hose connecting fittings; fluid hoses from said fittings to said cylinder actuating means; air flow control inlet sleeve means mounted on said end shaft means and being ported to cooperate therewith; fluid inlet hose means to said sleeve means; and solenoid air flow control valve means operably associated with said hoses to said cylinders to selectively shift said second jaw and element.

5. In a hogside skinning machine having a rotatably driven skinning drum, an elongated notch extending from end to end of said drum, and a clamping mechanism in said notch; said clamping mechanism including a first fixed elongated jaw on one side of said notch, having a plurality of elongated gripping ribs, a second shiftable elongated jaw facing said first jaw and having a plurality of elongated gripping ribs positioned to cooperate and intermesh with said first jaw ribs to form a gripping action therebetween, said second jaw having a pair of radially extending pivot arms on its opposite ends, with one end of each arm attached to said second jaw and the other end of each arm pivotally attached to the ends of said drum, a pair of extensible cylinder actuating means, each extending between the intermediate portions of one of said arms and said drum to shift said second jaw toward and away from said first jaw; said arms having side extension mounts; a third elongated element in said notch adjacent said second jaw and shiftable with respect thereto; a pair of end arms having one end attached to the opposite ends of said element and having the other ends pivotally attached to said extension mounts; a second pair of extensible cylinder actuator means extending between said extension mounts and said end arms to shift said element toward and away from said second jaws; said mounts, second pair of actuating means, end arms, and element being shiftable with said pivot arms and second jaw, said element having a plurality of hogside puncture pins extending toward said second and first jaws; said second jaw having a plurality of through-openings corresponding to said pins to allow said pins to extend therethrough into a hogside between said jaws when said element is shifted toward said second jaw; and said pins being retracted back through said second jaw to wipe the hogside off the pins upon opening of said jaws; and said air cylinder actuator means being valvingly pneumatically connected to a common source of pressure to cause simultaneous shifting of said element and second jaw toward said first jaw and away from said first jaw.

6. In a hogside skinning machine having an elongated skinning blade, a hogside guide surface closely spaced from said blade and gripping means mounted to travel normal to said elongated blade to pull a hogside past said blade; the improvement comprising a clamping mechanism composed of three main components including first and second gripping jaws shiftable into and out of interengagement with each other, and an anchor and wipe-off element adjacent one of said jaws and shiftable toward and away from said jaws, said element including a plurality of spaced hogside puncturing pins, and said one jaw having a plurality of through-openings aligned with said pins to allow passage of said pins with shifting of said element toward said jaws and withdrawal of said pins with shifting of said element away from said jaws, and power means to cause relative shifting of said jaws and said element.

7. The combination in claim 6 wherein said first jaw is relatively fixed, said second jaw includes support means shiftable therewith, said element is pivotally mounted to said support means, and said power means comprises first extensible means attached to said support means to shift said second jaw with respect to said first jaw and second extensible means between said support means and said element to shift said element with respect to said jaws.

8. The combination in claim 7 wherein said jaws have elongated teeth interengageable with each other upon interengagement of said jaws and said element is elongated and is on the opposite side of said second jaw from said first jaw, parallel to both jaws.

9. In combination in a hog skinning machine having a rotatably driven drum, an elongated notch endwise in the drum periphery, and hogside clamping means in said notch; said clamping means including a first elongated fixed jaw in said notch and a second elongated jaw in said notch shiftable into and out of gripping relation to said first jaw, power operated shifting means operably connected to said second jaw; orifice means in said jaws transverse to the elongated dimension thereof; a plurality of puncture pins aligned with said orifice means; shiftable support means mounting said pins, and power shifting means operably associated with said support means to project said pins through said orifice means to puncture and help hold a hogside between the jaws, and retract said pins therefrom to wipe the hogside therefrom.

References Cited by the Examiner
UNITED STATES PATENTS

| | | | |
|---|---|---|---|
| 2,292,319 | 8/1942 | Dziedzic et al. | 146—130 |
| 2,649,881 | 8/1953 | Runnells et al. | 146—130 |
| 2,989,105 | 6/1961 | Burch | 146—130 |

ROBERT C. RIORDON, *Primary Examiner.*

W. G. ABERCROMBIE, *Assistant Examiner.*